United States Patent
Popov

(10) Patent No.: US 7,130,045 B2
(45) Date of Patent: Oct. 31, 2006

(54) MONOCHROMATOR AND METHOD OF USE

(75) Inventor: Sergei Popov, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 410 days.

(21) Appl. No.: 10/468,070

(22) PCT Filed: Feb. 23, 2001

(86) PCT No.: PCT/EP01/02089

§ 371 (c)(1),
(2), (4) Date: Dec. 5, 2003

(87) PCT Pub. No.: WO02/068918

PCT Pub. Date: Sep. 6, 2002

(65) Prior Publication Data

US 2004/0071396 A1 Apr. 15, 2004

(51) Int. Cl.
*G01J 3/12* (2006.01)
*H04J 14/00* (2006.01)

(52) U.S. Cl. .................................. 356/331; 398/43
(58) Field of Classification Search ............... None
See application file for complete search history.

(56) References Cited

U.S. PATENT DOCUMENTS

| | | | | |
|---|---|---|---|---|
| 3,222,615 A | * | 12/1965 | Sandor | 372/66 |
| 3,976,356 A | * | 8/1976 | Jenkins | 385/126 |
| 4,175,830 A | * | 11/1979 | Marie | 359/484 |
| 4,213,060 A | * | 7/1980 | Byer et al. | 359/327 |
| 4,294,508 A | * | 10/1981 | Husbands | 385/47 |
| 4,338,570 A | * | 7/1982 | Kurnit | 330/4.6 |
| 4,439,860 A | * | 3/1984 | Kurnit | 372/20 |
| 5,815,523 A | * | 9/1998 | Morris | 372/66 |
| 5,835,231 A | * | 11/1998 | Pipino | 356/440 |

* cited by examiner

*Primary Examiner*—Hwa (Andrew) Lee
*Assistant Examiner*—Gordon J. Stock, Jr.

(57) ABSTRACT

A monochromator for isolating or recombining a narrowband optical signal from a broadband signal. A cylinder with a continuous outer wall and two planar end surfaces is composed of a dispersive medium. The cylinder forms a multi-reflective cavity, wherein a broadband optical signal entering the cavity through an end surface at an angle of incidence to the outer wall is repeatedly totally internally reflected off the outer wall. The outer wall includes exit points for permitting egress of spectral components. For recombination, narrowband optical signals are coupled into the body at different locations on the outer wall and propagated in substantially helical paths that converge at an end surface. The propagation path within the dispersive medium can thus be lengthened in a relatively compact space. The monochromator has low insertion loss, and does not require fine adjustment or particularly careful handling.

18 Claims, 3 Drawing Sheets

MONOCHROMATOR AND METHOD OF USE

This application claims the benefit of the filing date as provided in 35 U.S.C. 119 of PCT application number PCT/EP01/02089 filed on Feb. 23, 2001, the disclosure of which are incorporated herein by reference.

FIELD OF INVENTION

The invention relates to optical monochromators, such as for use in spectroscopy, signal processing, optical networking and other telecommunications applications.

BACKGROUND ART

The term monochromator covers a broad class of devices designed to produce one or more monochromatic components from a broadband input signal. An optical monochromator selects separate spectral components from a broadband optical signal and enables the reliable registration of these separate components by means of a detector. Monochromators may also be used to recombine spectral components into a broadband signal. The most commonly known monochromators exploit the dispersion or interference properties of light propagating through a material or space.

Dispersion occurs due to the dependence of the refractive index of a material on the wavelength of light propagating through it. When light is incident on the interface between two media with different refractive indices, spectral components will be refracted in different ways depending on their wavelength in accordance with Snell's law. The different wavelengths contained in a broadband signal can thus be separated spatially by propagation through dispersive material. This effect is used in the design of dispersion prisms.

The approach based on the phenomenon of interference is used in such devices as diffraction gratings and arrayed waveguide gratings (AWG). In these devices an interference pattern is created as a result of the different phase shift undergone by the various wavelength components in an optical signal. By making the interference pattern selectively constructive or destructive, specific wavelength components of the broadband optical signal can be made to propagate in different areas of space in the case of diffraction gratings or in different arms of a multipath waveguide in the case of AWGs.

Devices of the kind described above that spectrally resolve broadband optical signals find application in a range of areas, such as in the fields of spectroscopy, signal processing and WDM optical networking, to name but a few. For example, dispersion prisms and diffractive gratings are commonly used for optical spectrum analysers, while AWGs are key elements in WDM multiplexers and demultiplexers.

However, complex solutions are required when using dispersion prisms and diffraction gratings in optical spectrum analysers. In order to obtain good wavelength resolution the light paths must be long. This implies the use of either a large bulk element, i.e. a prism, or a complex cascaded system of diffractive gratings. Both solutions are relatively complex mechanically and have high tolerance requirements. They commonly also have multiple moving parts and consequently require careful handling and maintenance.

An essential requirement of AWGs is the precise alignment of many wavelengths in different light paths. This alignment, which provides the necessary phase shift for the different wavelengths, is also subject to strict tolerance requirements if it is to function correctly with a change in ambient temperature. Additionally, since the input optical signal is split into multiple wavelengths simultaneously, AWGs suffer considerable insertion loss.

SUMMARY OF THE INVENTION

It is an object of the present invention to overcome the disadvantages of prior art devices.

It is a further object of the invention to provide a device capable of reliably isolating and/or recombining spectral components of a broadband optical signal that is non-complex and relatively compact.

The above objects are achieved in an monochromator arrangement according to the claimed invention. Specifically, the arrangement has a body of rotational symmetry made up of a dispersive medium. In its simplest form the body is a cylinder with a continuous outer wall and two planar end surfaces. However, the outer wall may alternatively comprise multiple faces and thus have a polygonal cross-section. The body forms a multi-reflective cavity, wherein a broadband optical signal entering the cavity through a planar end surface at an angle of incidence to the outer wall is repeatedly totally internally reflected off the outer wall. At least one exit point is provided in the outer wall for permitting egress of a spectral component of the broadband signal.

As light enters the body through one of the planar surfaces and incident on the outer wall, it will describe a substantially helical path through the cavity. By means of this arrangement, the propagation path within the dispersive medium is lengthened. Thus high spatial separation of spectral components subject to different degrees of refraction on entry into the medium can be obtained in a relatively small and compact area.

The invention further relates to a monochromator arrangement for recombining component wavelengths into a broadband optical signal. The arrangement has a body of rotational symmetry about an axis that is made up of a dispersive medium. It has an outer wall extending in parallel with the axis and at least one planar end surface. The outer wall may be continuous or comprise multiple faces and thus have a polygonal cross-section. The body forms a multi-reflective cavity, wherein light may be directed into the cavity at select locations through the outer wall such that it is totally internally reflected at the outer wall and describes a substantially helical propagation path and exits the body at a defined location in the planar surface. Preferably light is coupled into the body at different locations on the outer wall using lasers.

The monochromator according to the invention can thus have very small dimensions resulting in a compact and light device. The arrangement is simple to manufacture. It also has low insertion loss and, being devoid of mechanically movable parts, does not require fine adjustment or particularly careful handling.

When the device is used to isolate spectral components, it is possible, by selecting the angle of incidence on the body outer wall to constrain the signal to be incident on the outer wall more than once on a line lying parallel with the axis. In other words, the beam will be reflected at the same radial point in the outer wall in different turns of the helix. Accordingly, different spectral components may conveniently be coupled out of the body at the same radial position on the outer wall, but at different axial locations corresponding to different turns of the helical path. Similarly, in the recombination device, separate optical signals consisting of different wavelengths of light are preferably coupled into the body along a line lying parallel with the axis.

BRIEF DESCRIPTION OF THE DRAWINGS

Further objects and advantages of the present invention will become apparent from the following description of the preferred embodiments that are given by way of example with reference to the accompanying drawings. In the figures.

DETAILED DESCRIPTION OF THE DRAWINGS

Figure 1:
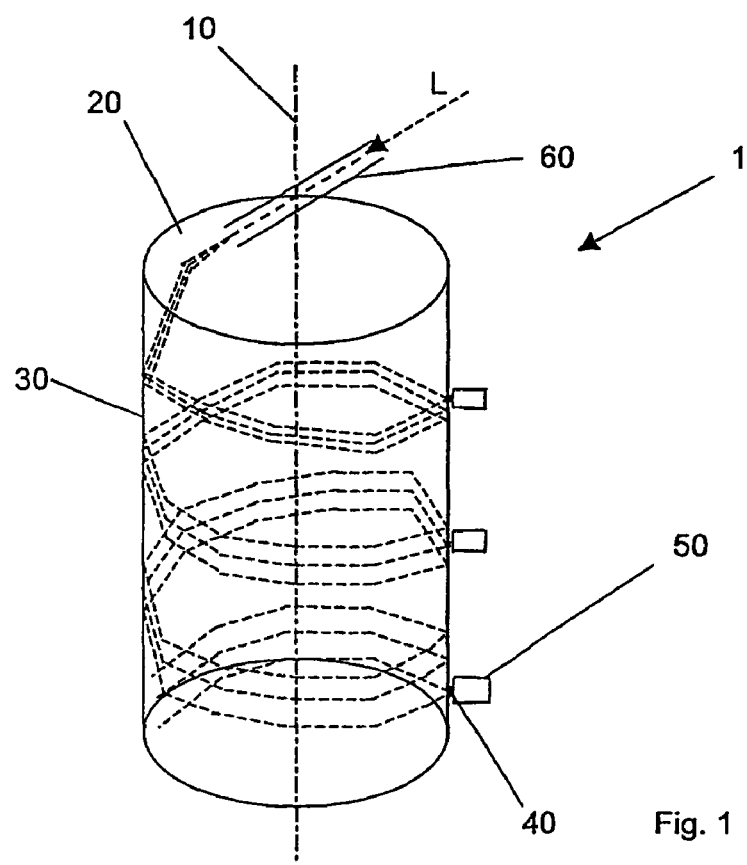
FIG. 1 schematically shows the structure of a monochromator in accordance with the present invention, FIG. 2 schematically illustrates the propagation of light within a circular enclosed cavity, FIGS. 3a, 3b and 3c schematically illustrate different modes of propagation within an enclosed cavity with rotational symmetry, FIG. 4 schematically depicts a side view of the monochromator of FIG. 1 showing the propagation paths of the spectral components, and FIG. 5 schematically illustrates a monochromator arrangement adapted to recombine spectral components.

FIG. 1 shows a monochromator in accordance with the present invention. The monochromator has a body 1 which has rotational symmetry about an axis 10 and is bounded by two planar surfaces 20 lying perpendicular to the axis 10. An outer wall 30 joining the two planar surfaces 20 of the body 1 is rotationally symmetrical about the axis 10. In its simplest form this body 1 is a cylinder as illustrated in FIG. 1 with the outer wall 30 being continuous and having a circular cross-section, however the outer wall 30 may comprise multiple faces.

The body 1 essentially forms a multi-reflective cavity, wherein light that has entered the medium of the body 1 is propagated by total internal reflection around the outer wall 30. The body is of any suitable dispersive material transparent to the optical radiation of interest. It is selected to have a refractive index that is higher than the surrounding medium. Suitable materials include heavy glasses and quartz-based glasses.

The monochromator having this structure functions using the effects of total internal reflection and material dispersion. More specifically, as illustrated in FIG. 1 a beam of light depicted by the dashed line L is directed into the body through one of the planar surfaces 20 and is refracted on entry into the body 1 in accordance with the relative refractive index of the material forming the body 1 to that of the medium outside the body. As illustrated schematically in FIG. 1, an input arrangement 60 couples light into the body 1 at a desired angle. This arrangement may take a number of different forms well known to the person skilled in the art. While the lowest insertion loss is obtained when light is coupled into the body 1 from air, other media may be used. For example in FIG. 1 an optical fibre or waveguide structure is illustrated fused to the body 1 in the desired orientation. Such a waveguide preferably has a lower refractive index than the body to reduce insertion loss, however, since the angle of incidence will generally be smaller than the critical angle, it is also possible to use a waveguide of higher refractive index than the body 1.

The incident beam is a broadband signal containing several component wavelengths. On entering the body 1, therefore, the beam is dispersed as a result of the wavelength dependence of the refractive index. For the sake of clarity the incident beam is shown in FIG. 1 separated into three distinct beams of light. It will be understood, however, that the beam is in fact broadened as a result of the dispersion. The dispersed beam of light is then repeatedly totally internally reflected on the outer wall 30 of the body 1. This naturally implies that the angle of incidence of the beam on the outer wall 30, i.e. the angle of incidence in the plane of the incident and reflected beam, is greater than the critical angle for the media in and around the body 1 for all wavelengths of light. The light describes an approximate helical path propagating progressively away from the planar incident surface 20 as it is reflected around the outer wall 30 bounding the cavity. Different wavelengths within the optical signal are subject to different degrees of refraction. The result is therefore a broadening of the beam with different wavelengths following separate approximate helical propagation paths.

Along the outer wall 30 of the body 1, exit points 40 are arranged for coupling the different spectral components separated within the body cavity out of the body 1. As shown in FIG. 1, a photodetector 50 or similar device for detecting and measuring the intensity of radiant energy is positioned at each exit point 40 to register the signal corresponding to the selected wavelength. The exit points 40 are localised areas designed to destroy the total internal reflection of an incident beam. This can be achieved in a number of ways. Preferably, however, a material of higher refractive index is placed at the point of interest. This material may, for example, be a small spot of glue having appropriate material properties. Another method of coupling light out of the body 1 at an exit point 40 is to provide a superficial incision, notch or scratch on the surface of the outer wall 30 to change the angle of reflection.

Figure 2:
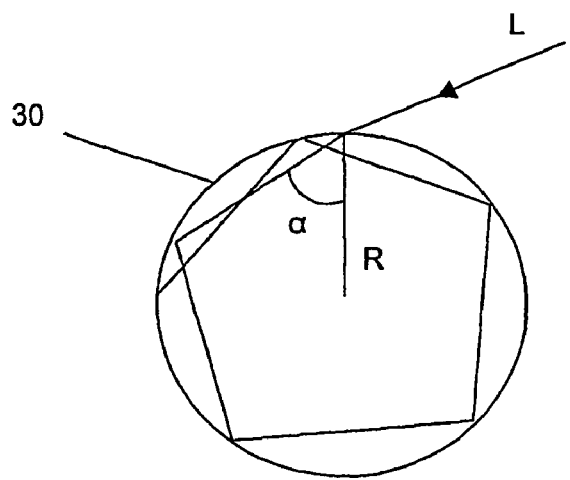

The operation of the monochromator will now be explained with reference to FIGS. 2 to 4.

Figure 3A:
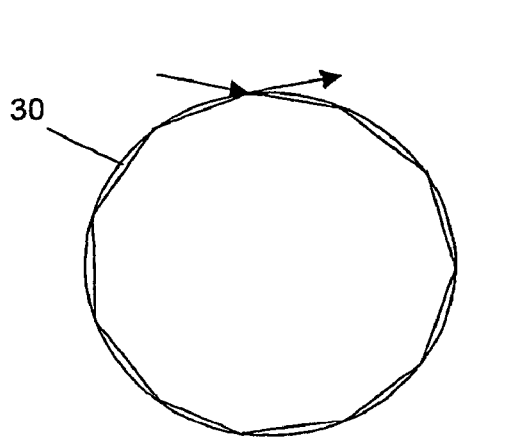
Figure 3B:
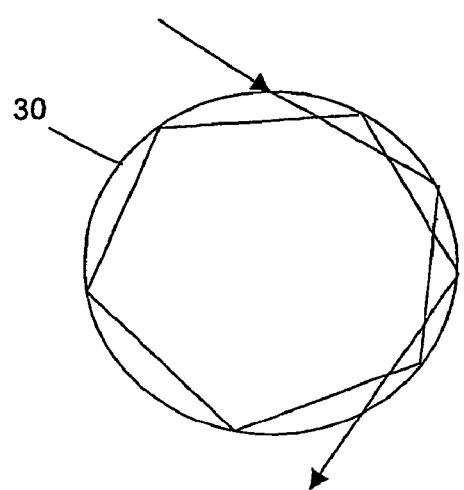
Figure 3C:
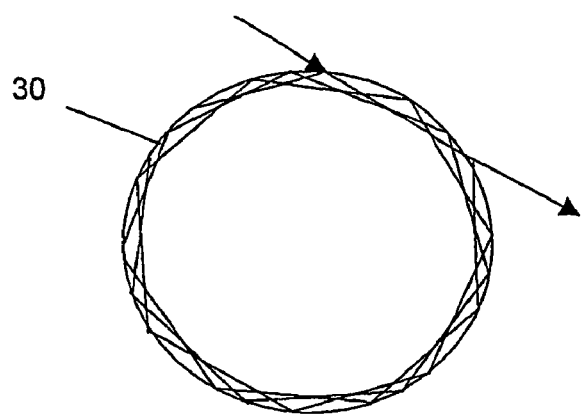

The propagation of light within closed cavities with rotational symmetry can be described using Fractal optics. FIG. 2 shows the body 1 of FIG. 1 viewed from one of the planar surfaces 10. In the embodiment illustrated, the outer wall 30 forms a cylinder so that the enclosed cavity illustrated by the end view of the body 1 is circular with radius R. However, the following description applies equally to enclosed cavities of other shapes having rotational symmetry. In FIG. 2 a light beam represented by the line L entering the enclosed cavity through the outer wall 30 is incident on the cavity wall 30 at an angle $\alpha$. This angle $\alpha$ is the component of the angle of incidence measured in a plane perpendicular with the body axis 20 and for clarity will be referred to hereinafter as the planar incident angle $\alpha$. It will be understood that the real angle of incidence, i.e. the angle lying in the plane of the incident and reflected beams, must be greater than the critical angle for the interface between the cavity and the surrounding medium. It is known that a light beam entering an enclosed circular cavity filled with a medium is propagated along a path that forms a polygon enclosed in the circle defined by the cavity wall 30. Depending on this planar incident angle $\alpha$, the polygon traced by the beam may close itself, that is arrive at the starting point on the circle after a single rotation, after several (N) rotations, or it may never close itself. These three different modes of intercavity propagation are illustrated in FIGS. 3a, 3b and 3c, respectively. In accordance with Fractal optics the mode of propagation within such a cavity is determined by the ratio of the number of rotations of the polygon N to the total number of reflections M within the cavity. When the ratio N/M is a real number, the polygon closes itself after N rotations in the plane perpendicular to the axis 10 of the cylinder. The ratio M/N is related to the planar incident angle α by the following expression:

$$\alpha = \pi/2 - M/N \times \pi.$$

Figure 4:
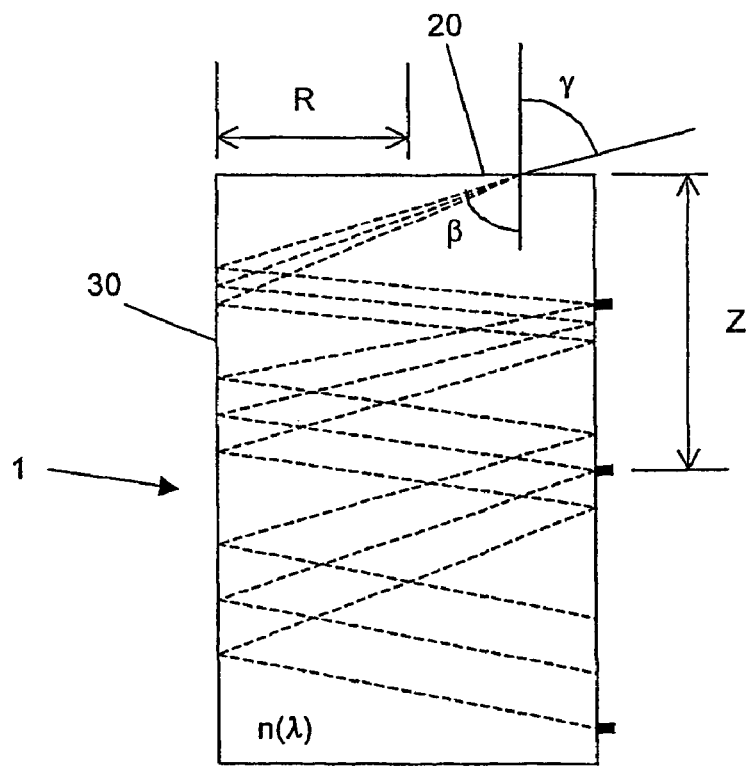

Turning now to FIG. 4 there is shown a side view of the body 1 of FIG. 1 with the propagation path of an incident light beam illustrated schematically. The body 1 is of a material having a wavelength dependent refractive index represented by n(λ). It is assumed for simplicity that the refractive index of the medium surrounding the body 1 is 1 so that the refractive index of the body n(λ) is equivalent to the relative refractive index of the body medium to the surrounding medium. When the light beam enters the planar surface 20 under an angle γ and is incident on the outer wall 30, it propagates along a substantially helical path. The pitch of the helix depends on the incident angle γ. Both the incident and the refracted beams lie in the same plane, which is parallel to the axis 10 of the cylinder. Moreover, the line of intersection between the incident plane and the planar surface 20 coincides with the projection of a chord of the polygon (see FIGS. 3a to 3c) traced by the propagating beam. If the incident beam contains several wavelengths they will be refracted under different angles β in the plane of incidence as a result of the higher refractive index n(λ) of the body 1. The result is a dispersed helix or helix bundle consisting of several separate approximate helices with different pitch traced by each wavelength component. The approximate helices making up this helix bundle are incident on the outer wall 30 at the same radial position, but spread in the axial direction. The resolution between spectral components increases progressively along the propagation path as the helix bundle broadens. It is possible to couple light out of the body 1 at any point of reflection on the outer wall 30 providing that the spectral resolution at that point is sufficient to isolate the wavelength or wavelengths of interest. In other words, exit points 40 may be placed at any point around the outer wall 30 corresponding to the points of reflection shown in FIGS. 3a, 3b and 3c. For those applications wherein the delay between different wavelengths must be kept to a minimum, for example in the case of some high speed wavelength division multiplex (WDM) communication applications, several spectral components must be isolated at substantially the same point along the helix bundle. In this case, the wavelengths of interest making up the helix bundle must be incident on the outer wall 30 at a position sufficiently spaced from one another to permit the positioning of the required number of aligned axially photodetectors 50.

For applications in which a delay between different spectral components is not critical, such as the pure isolation of specific wavelengths, it will be understood that each wavelength may be coupled out of the body 1 at a different point along the dispersed helix. This can naturally be achieved by locating exit points and photodetectors at different radial positions on the outer wall 30. However, by selecting the planar incident angle α such that the ratio M/N is a real number and this number is small, the polygon described by the helix bundle will close itself several times along the path of the helix with each of these closing points lying in a straight line parallel with the axis 10. In other words, the planar angle of incidence α is selected such that the optical signal is reflected more than once at at least one line on the outer wall 30 lying parallel with the axis 10. An array of axially aligned exit points 40 and corresponding photodetectors 50 may then be disposed at the required radial position on the outer wall 30 to couple the different wavelengths out of the body 1 at different turns of the helix bundle. This is illustrated in the arrangement of FIGS. 1 and 4, wherein the quantity M/N is 1, such that different wavelengths are coupled out of the body 1 at successive turns of the helix.

As a result of dispersion at any one radial closure point of the helix bundle, different wavelengths or 'colours' will be incident on the outer wall 30 at a different distance, denoted by 'Z' from the planar surface 20. For any component wavelength of the broadband signal, the axial position of a closure point relative to the planar surface 20, Z, is described by the following relation:

$$Z = 2 \times R \times N \times \sin(M/N \times \pi) \times \tan(\pi/2 - \beta),$$

where the angle of refraction β depends on the ratio of the refractive index n(λ) (or rather the relative refractive index) of the body material, which in turn is dependent on the wavelength of the light in accordance with Snell's law.

$$\tan\beta = \sin\gamma \Big/ \sqrt{n(\lambda)^2 - \sin^2\gamma}$$

The principle of the monochromator in accordance with the present invention has been described with reference to a cylindrical body 1. However, while a cylinder is the simplest form of body with rotational symmetry it will be appreciated that the outer wall 30 may alternatively be made up of multiple faces, such that it has a polygonal cross-section. In this case, the order of the polygon is preferably selected in conjunction with the angles α and γ to ensure that the ratio N/M is an integer.

By guiding an incident beam into a helix using the enclosed cavity defined by the body outer wall 30, the propagation path can be lengthened sufficiently to provide reliable separation of wavelengths in a very compact device. It is apparent from the above description and FIG. 4 in particular, that the larger the angle of incidence γ the smaller the pitch of the helical propagation path, while a smaller angle of incidence γ will result in a greater resolution on the outer wall 30 at an equivalent distance along the propagation path. It will further be appreciated that the angle of incidence γ should not be so large, and consequently the pitch of the helix bundle so small, that the parts of the helix bundle overlap in successive turns, although a certain amount of overlap can be tolerated providing it does not affect the wavelengths of interest. The optimum arrangement should naturally be selected as a function of the wavelengths of light in question, on the body material 1 and also on the specific application. For example, it was possible to reliably separate wavelengths in the near infrared radiation range, i.e. between about 1 and 1.5 μm, using a cylindrical body 1 of a quartz-based glass surrounded by air with a refractive index of about 2 with a diameter of between 1 to 2 cm and a length of between 5 and 10 cm and using an angle γ of incidence of around 60° and an angle of incidence α of at least 70°.

Figure 5:
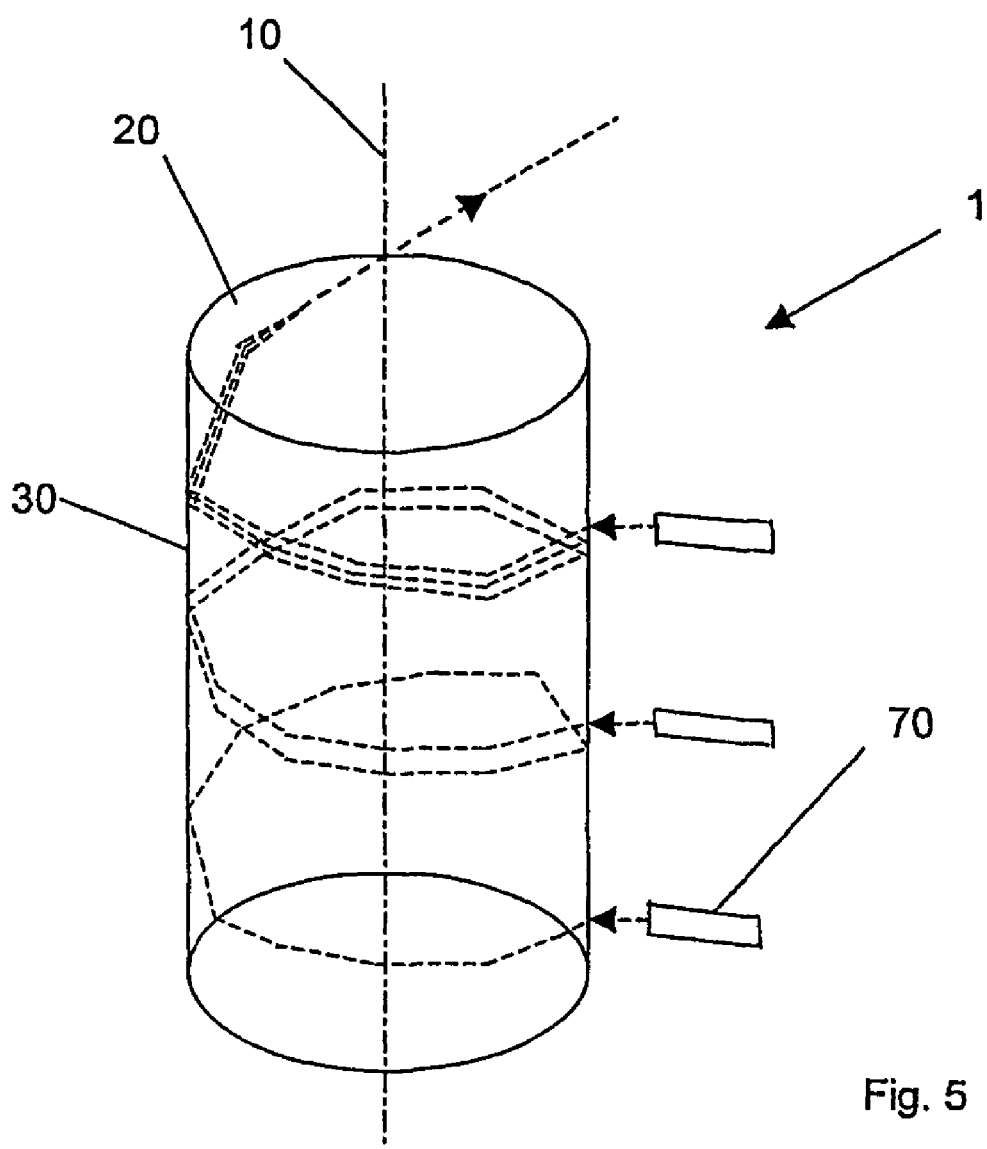

The structure of the monochromator described with reference to FIGS. 1 to 4 can also be used to combine narrow portions of a spectrum into a broadband optical signal. Such an arrangement is schematically shown in FIG. 5. This device shown in FIG. 5 includes a body 1 that is substantially the same as that shown in FIGS. 1 to 4, and like parts are therefore denoted by like references numerals. The structure differs from the device already described by the provision of light sources 70 adapted to guide or generate light of different wavelengths. These light sources 70 may for example be lasers and are positioned adjacent the body outer wall 30 such that light is coupled into the body at an angle of incidence which causes the light to be propagated in a substantially helical path towards the planar surface 20. It will be understood that the angle of incidence for each separate spectral component will be slightly different dependent on the wavelength so that each component follows a helical path with the required pitch. The point of entry of each spectral component is identically positioned to the exit point for the same spectral component in the device illustrated in FIG. 1. The substantially helical paths described by each separate spectral component will converge gradually towards the planar surface 20 until they become coincident at a point of egress in the planar surface 20. A suitable guiding arrangement or registration device is placed in the path of the emerging broadband signal.

The same considerations with respect to delays between the individual narrow band signals are naturally valid when these signals are combined. This can be minimised by coupling the different spectral components into the body 1 at substantially the same distance from the planar surface 20, i.e. such that turn of the helix bundle. When some delay between the different wavelength components can be tolerated, the propagation path of the signals is preferably chosen such that the ratio N/M is a small integer so that the different wavelengths may be coupled into the body along a line parallel with the body axis 10.

The invention claimed is:

1. A monochromator comprising:
a multi-reflective outer wall having rotational symmetry about an axis, said outer wall surrounding a cavity made up of a solid dispersive medium, said cavity extending in parallel with, and surrounding, said axis;
at least one planar end surface positioned substantially perpendicular to said axis for permitting ingress of a broadband optical signal into said cavity at an angle of incidence to said outer wall such that said optical signal is internally reflected by the outer wall and follows a substantially helical propagation path within, the solid dispersive medium within the cavity; and
at least one spectral component exit point at a location on said outer wall corresponding to a point of total internal reflection for permitting egress of a spectral component of said optical signal from within said cavity.

2. The monochromator of claim 1 further comprising an input arrangement for directing said optical signal into said cavity through said planar surface at said angle of incidence to said outer wall such that said signal is internally reflected.

3. The monochromator of claim 2 wherein said input arrangement is disposed to direct said optical signal at said angle of incidence to said outer wall such that said optical signal is incident on said outer wall on at least one line lying parallel with said axis at least twice.

4. The monochromator of claim 1 wherein the outer wall includes a plurality of exit points, said exit points being arranged on said outer wall in a line running parallel to the axis.

5. The monochromator of claim 1 wherein the cavity is substantially cylindrical.

6. The monochromator of claim 1 further comprising a photodetector arranged adjacent the at least one spectral component exit point on the outer wall for receiving light from the cavity.

7. The monochromator of claim 1 further comprising a means for locally destroying the total internal reflection of an optical signal propagated within said body disposed at each spectral component exit point.

8. The monochromator of claim 1 wherein each spectral component exit point includes on the outer wall, a localized area of a material having a higher refractive index than the solid dispersive medium within the cavity.

9. The monochromator of claim 1 wherein the spectral component exit point includes a superficial incision in the outer wall that is oriented to change the angle of reflection of the outer wall.

10. A method of isolating at least one spectral component from a broadband optical signal, said method comprising:
providing a body made up of dispersive material and having rotational symmetry about an axis with an outer wall extending in parallel with said axis and a planar surface perpendicular to said axis,
directing a broadband optical signal into said body through said planar surface at an angle of incidence to said outer wall such that said signal is repeatedly internally reflected at said outer wall and describes a substantially helical propagation path, and
coupling at least one spectral component out of said body at a location of incidence of said signal on said outer wall.

11. The method of claim 10, further comprising:
selecting said angle of incidence to said outer wall such that said signal is incident on at least one line lying parallel with said axis on said outer wall at least twice and
coupling components of said signal from said body at more than one location on said line.

12. An apparatus comprising:
a body made up of a dispersive medium, having rotational symmetry about an axis and forming an enclosed multi-reflective cavity bounded by an outer wall extending in parallel with, and surrounding, said axis, said body further including a planar end surface perpendicular to said axis for permitting egress of a broadband optical signal, wherein at least two narrow band optical signal sources are disposed at positions relative to said body such that light from said sources is coupled into said body through said outer wall and internally reflected at said outer wall to describe substantially helical paths that converge on exiting said planar surface into a broadband optical signal.

13. The apparatus of claim 12 wherein said body is substantially cylindrical.

14. The apparatus of claim 12 wherein said light sources are aligned with the axis of the body.

15. The apparatus of claim 12 wherein said light sources are lasers.

16. A method of combining at least two narrowband optical signal into a broadband signal, the method comprising:
providing a body made up of dispersive material and having rotational symmetry about an axis with an outer wall extending in parallel with said axis and a planar surface perpendicular to said; and
directing narrowband optical signals into said body at different locations through said outer wall at an angle of incidence to said outer wall such that said signals are repeatedly totally internally reflected at said outer wall and describe substantially helical propagation paths that converge at said planar surface.

17. The method of claim 16 further comprising directing said narrowband optical signals through said outer wall on a line lying parallel with said axis.

18. A method of isolating at least one spectral component from a broadband optical signal, said method comprising:

directing a broadband optical signal into a body through an outer surface at an angle of incidence to the outer surface, splitting the broadband optical signal into a plurality of spectral components, directing the plurality of spectral components within the body such that the plurality of spectral components are internally reflected and follow a substantially helical propagation path, and directing at least one of the plurality of spectral components to a location of incidence such that the at least one spectral component exits an outer wall of the body.

* * * * *

UNITED STATES PATENT AND TRADEMARK OFFICE
CERTIFICATE OF CORRECTION

| | | |
|---|---|---|
| PATENT NO. | : 7,130,045 B2 | Page 1 of 1 |
| APPLICATION NO. | : 10/468070 | |
| DATED | : October 31, 2006 | |
| INVENTOR(S) | : Popov | |

It is certified that error appears in the above-identified patent and that said Letters Patent is hereby corrected as shown below:

In Column 8, Line 64, in Claim 16, after "said" insert -- axis --.

Signed and Sealed this

Eighteenth Day of December, 2007

JON W. DUDAS
*Director of the United States Patent and Trademark Office*